United States Patent [19]

Dyer

[11] Patent Number: 5,201,872
[45] Date of Patent: Apr. 13, 1993

[54] GATE VALVE IMPROVEMENT
[75] Inventor: Michael L. Dyer, Sugar Land, Tex.
[73] Assignee: Superior Oilfield Products, Inc., Houston, Tex.
[21] Appl. No.: 826,127
[22] Filed: Jan. 27, 1992
[51] Int. Cl.[5] ............................................. F16K 25/02
[52] U.S. Cl. ......................................... 251/172; 251/328
[58] Field of Search ........................ 251/172, 196, 328
[56] References Cited

U.S. PATENT DOCUMENTS

| | | | |
|---|---|---|---|
| 4,401,292 | 8/1983 | Whaley | 251/172 |
| 4,471,943 | 9/1984 | Nelson | 251/328 |
| 4,759,529 | 7/1988 | Berger et al. | 251/328 |
| 4,878,651 | 11/1989 | Meyer | 251/172 |

Primary Examiner—Stephen M. Hepperle

[57] ABSTRACT

An improved gate valve is provided having improved operating characteristics. Bore pressure in the body cavity of the valve in the open or closed position is isolated. In the closed position a double metal sealing barrier is provided across the gate and in the open position the pressure is isolated from the stem packing and bonnet gasket by the seats on either side of the gate. Formation of hydrates in the body cavity is eliminated and better retention of the body grease is achieved during flow through the valves. Metal-to-metal seal surfaces are developed thereby eliminating wear on the non-metal components and reducing torque requirements.

2 Claims, 3 Drawing Sheets

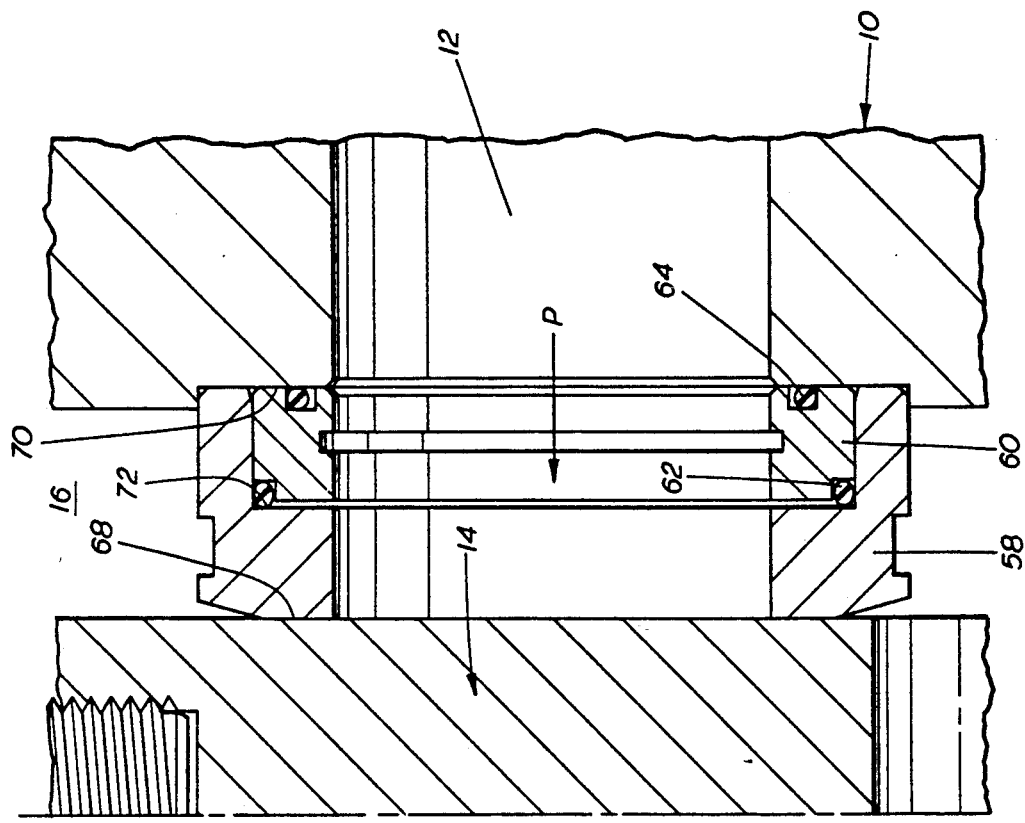
FIG. 3 (VALVE CLOSED)
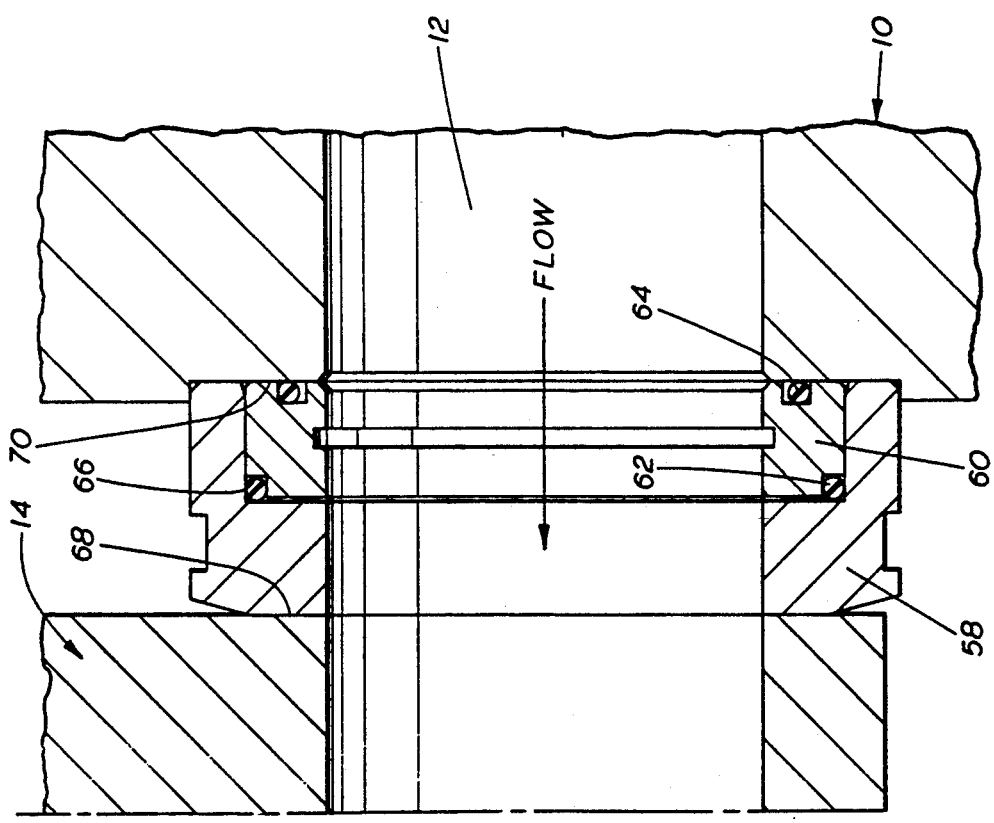
FIG. 2 (VALVE OPEN)

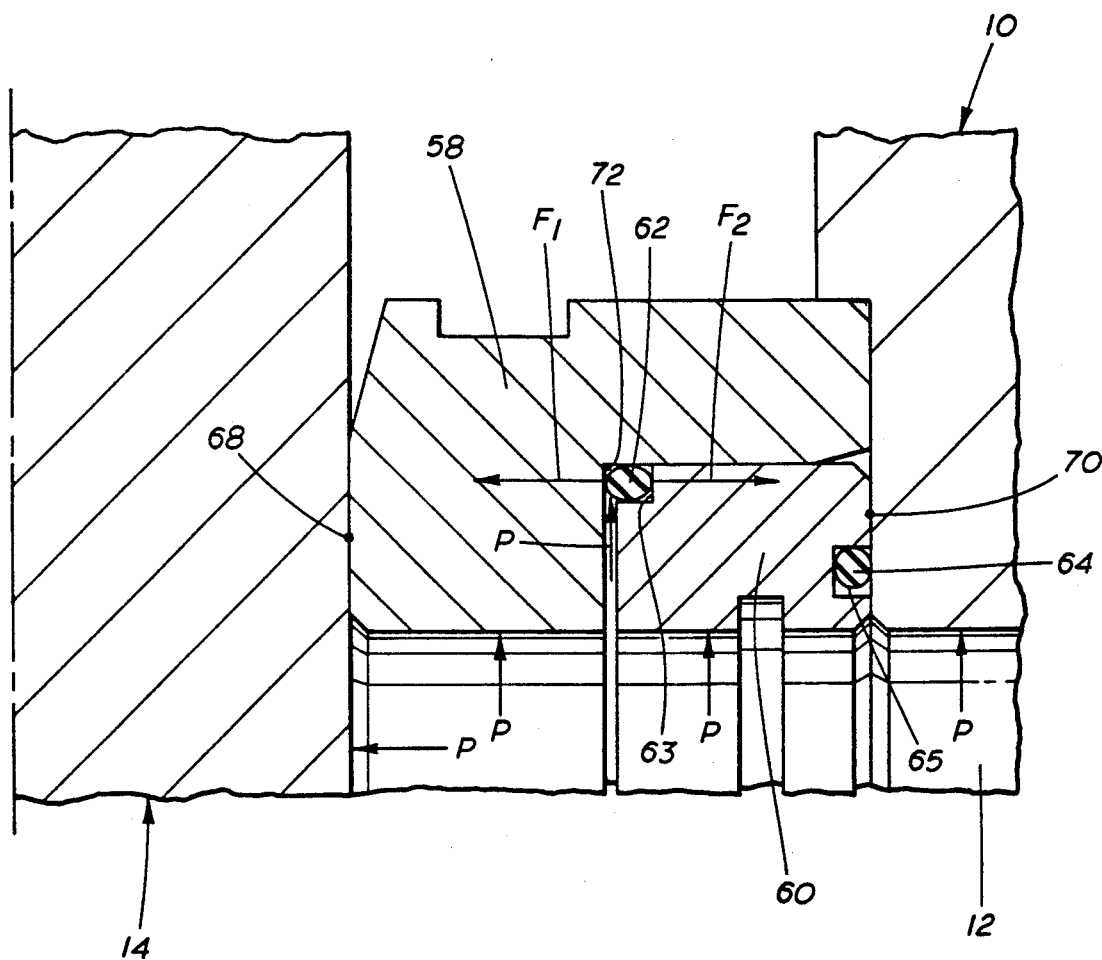
FIG. 4 (VALVE CLOSED)

GATE VALVE IMPROVEMENT

BACKGROUND OF THE INVENTION

I. Field of the Invention

The present invention relates to valves and more particularly to an improved gate valve structure.

II. Description of the Related Art

U. S. Pat. No. 4,741,509 issued May 3, 1988 to Bunch et al for "Gate Valve With Improved Secondary Body to Bushing Seals" and U. S. Pat. No. 4,878,651 issued Nov. 7, 1989 to Meyer, Jr. for "Valve Seat Assembly" both disclose gate valve apparatus. The Bunch et al patent is directed to a bushing improvement and the Meyer, Jr. patent is directed to a retainer ring structure. Neither of these patents discloses or suggests the improved metal-to-metal seal surfaces of the present invention.

SUMMARY OF THE INVENTION

The present invention provides an improved gate valve in which bore pressure in the body cavity of the valve in the open or closed position is isolated. In the closed position, an elastomeric seal which may be an O-ring is compressed to create axial loading of a two piece seat assembly thereby insuring metal contact at two surfaces. The sealing diameter of one sealing area is larger than the opposing sealing surfaces. The bore pressure increases the axial loading of the seat assembly on to the gate and body seal surfaces. An opposite seat assembly from the pressure provides metal-to-metal sealing if any pressure does leak past the pressure side seat assembly of the valve. Also the seat assemblies isolate the valve cavity and bonnet from pressure in the bore to prolong valve life and to increase reliability. In the open position, the pressure is isolated from the stem packing and bonnet gasket by seats on either side of the gate of the valve. Formation of hydrates in the body cavity is eliminated and better retention of the body grease is achieved during flow through the gate valve. In both the open or closed position, valve body cavity pressure is minimized on the stem packing which decreases valve open and closing operation torque requirements.

BRIEF DESCRIPTION OF THE DRAWINGS

FIG. 2 is an enlarged, sectional view of the gate valve bore in an open position;

FIG. 3 is an enlarged, sectional view of the gate valve bore in a closed position; and FIG. 4 is an enlarged, sectional view of the upper part of the seal shown in FIG. 3.

DESCRIPTION OF THE PREFERRED EMBODIMENT

Figure 1:
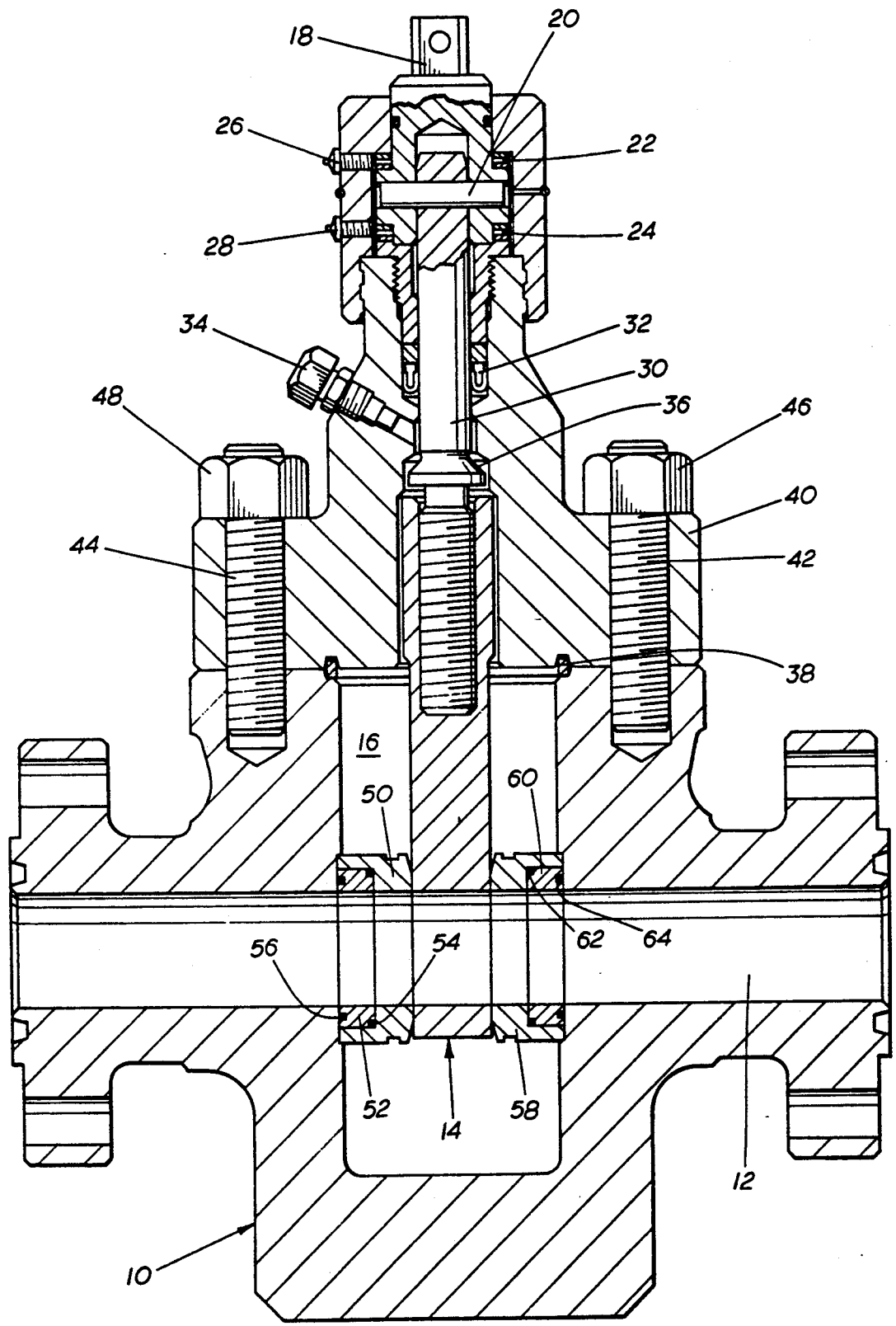
FIG. 1 is a partial sectional, elevational view of a typical gate valve of the present invention in an open position.

FIG. 1 is a partial sectional, elevational view of the gate valve of the present invention in an open position. Body 10 has a bore 12 extending through such body with flow being from right to left. A gate 14 is positioned in cavity 16 to allow bore 12 to be open or closed upon rotation of the head 18.

A stem shear pin 20 is positioned between heavy duty thrust bearing 22 and 24. Bearing grease fitting 26 and 28 allow lubrication of the heavy duty thrust bearings 22 and 24. Stem 30 has a teflon jacketed stem packing 32 and a body cavity grease injection and vent fitting 34 is positioned below the teflon jacketed stem packing 32.

A metal sealing stem backseat 36 is positioned below the body cavity grease injection and vent fitting 34.

A metal or elastomeric sealing bonnet gasket 38 is positioned between body 10 and member 40 which is connected to body 10 with a plurality of bolts such as bolt 42 and bolt 44 having nuts 46 and 48. Seat 50 has an insert 52 having an elastomeric seal 54 and a seal ring 56. On the other side of the gate 14 is seat 58 and insert 60 having elastomeric seal 62 and seal ring 64. Pressure is isolated from stem packing 32 and from bonnet gasket 38 by the seats 50 and 58 on either side of the gate 14. The arrangement of the seats and inserts along with the elastomeric seals and seal rings provides a seal assembly having metal-to-metal seal surfaces as will be explained in detail subsequently. The metal-to-metal seal surfaces prolongs the life of the valve and increases reliability of the valve.

FIG. 2 is an enlarged, sectional view of the gate valve bore in an open position. As explained in connection with FIG. 1, seat 58 has an insert 60. Positioned between seat 58 and insert 60 is an elastomeric seal 62. Seal ring 64 is positioned between insert 60 and body 10 having bore 12.

Compression of the elastomeric seal 62 at area 66 creates axial loading of the two piece seat assembly on to the gate seal surface 68 and the body seal surface 70. Thus, metal contact is maintained under all operating conditions at gate seal surface 68 and body seal surface 70.

FIG. 3 is an enlarged, sectional view of the gate valve bore in a closed position. Gate 14 closes bore 12 and seat 58 with insert 60 is positioned so that compression of elastomeric seal 62 creates axial loading of the two piece seat assembly on to gate seal surface 68 and body seal surface 70. Thus metal contact is maintained under all operating conditions at gate seal surface 68 and body seal surface 70.

The sealing diameter at the elastomeric sealing area 72 is larger than the opposing sealing surfaces so that the bore pressure increases the axial loading of the seat assembly on to the gate seal surface 68 and the body seal surface 70.

The opposite seat assembly from the pressure side of the bore provides metal-to-metal sealing if any pressure does leak past the pressure side seat assembly or if there is failure of the elastomeric seals. The seat assemblies isolate the valve cavity 16 and the bonnet (not shown in FIG. 3) from pressure in the bore 12. Valve life is prolonged and reliability is increased. The valve lubricant is also retained in the valve cavity and is isolated from the bore.

FIG. 4 is an enlarged, sectional view of the upper part of the seal shown in FIG. 3. Gate 14 is in a closed position so that bore 12 is closed. Seat 58 is positioned over insert 60. Elastomeric seal 62 is positioned in recess 63 between seat 58 and insert 60 to provide elastomeric sealing area 72. Seal ring 64 positioned in groove 65 acts to provide a body seal surface 70.

The letter "P" indicates direction and location of pressure and $F_1$ and $F_2$ are force indicators.

Thus, there are metal-to-metal seal surfaces under all operating conditions thereby providing an improved and more effective gate valve in the disclosed embodiment as well as other gate valve applications. The present invention may be used with gate valves manufactured by various manufacturers.

Although a preferred embodiment of the invention has been shown and described in accordance with the requirements of the U.S. Patent Law, it will be appreciated by those skilled in the art to which the present invention pertains that modifications, variations, and improvements may be made without departing from the spirit of the invention defined by the claims.

I claim:

1. A sealing assembly adapted for positioning between the body and the gate of a gate valve, said assembly including in combination a substantially circular seat having a substantially circular protrusion extending on the outer portion of said seat, a substantially circular insert positioned in said seat and having a recess along the outer edge on one side of said insert and a circular groove in the outer side of said insert, an elastomeric seal positioned in said recess between said seat and said insert, and a seal ring positioned in said circular groove of said insert adjacent said body whereby continuous metal to metal sealing areas are provided between said seat and said gate and between said insert and said body in said gate valve.

2. A gate valve having a body with a bore, a bonnet, a bonnet gasket positioned between said bonnet and said body, connecting means for connecting said bonnet and said body, and a gate movable in said body by a stem, wherein the improvement comprises a first assembly positioned in said bore on one side of said gate and a second assembly positioned in said bore on the other side of said gate, each of said first assembly and said second assembly including in combination a substantially circular seat having a substantially circular protrusion extending on the outer portion of said seat, a substantially circular insert positioned in said seat and having a recess along the outer edge on one side of said insert and a circular groove in the outer side of said insert, an elastomeric seal postioned in said recess between said seat and said insert, and a seal ring positioned in said circular groove of said insert adjacent said body whereby continuous metal to metal sealing areas are provided between said seat and said gate and between said insert and said body in said gate valve.

* * * * *